(12) United States Patent
Wang et al.

(10) Patent No.: US 10,978,921 B1
(45) Date of Patent: Apr. 13, 2021

(54) WIRELESS POWER SYSTEM WITH EFFICIENCY PREDICTION

(71) Applicant: Apple Inc., Cupertino, CA (US)

(72) Inventors: Ge Wang, San Jose, CA (US); Stephen C. Terry, San Jose, CA (US); Wynand Malan, Auckland (NZ); Zachary S. Harris, Auckland (NZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/994,308

(22) Filed: Aug. 14, 2020

Related U.S. Application Data

(60) Provisional application No. 62/994,444, filed on Mar. 25, 2020.

(51) Int. Cl.
  *H02J 50/80* (2016.01)
  *H02J 50/10* (2016.01)
  *H04B 5/00* (2006.01)

(52) U.S. Cl.
  CPC .............. *H02J 50/80* (2016.02); *H02J 50/10* (2016.02); *H04B 5/0037* (2013.01)

(58) Field of Classification Search
  CPC ............. H02J 50/00; H02J 50/12; H02J 50/80
  See application file for complete search history.

(56) References Cited

U.S. PATENT DOCUMENTS

| | | | |
|---|---|---|---|
| 10,581,272 B2 | 3/2020 | Sankar | |
| 10,707,690 B2 | 7/2020 | Jung et al. | |
| 2011/0006603 A1* | 1/2011 | Robinson | H02J 4/00 307/31 |
| 2012/0212072 A1* | 8/2012 | Miyabayashi | H02J 50/40 307/104 |
| 2013/0264880 A1* | 10/2013 | Kim | H02J 13/0006 307/66 |
| 2014/0139035 A1* | 5/2014 | Ishihara | H02J 7/025 307/104 |
| 2016/0141908 A1* | 5/2016 | Jakl | H02J 7/00047 320/108 |
| 2016/0344241 A1* | 11/2016 | Hong | H02J 7/00045 |
| 2018/0287413 A1 | 10/2018 | Jung | |
| 2019/0140699 A1 | 5/2019 | Park et al. | |

* cited by examiner

*Primary Examiner* — Rexford N Barnie
*Assistant Examiner* — Joseph N Inge
(74) *Attorney, Agent, or Firm* — Treyz Law Group, P.C.; G. Victor Treyz; Jason Tsai

(57) ABSTRACT

A wireless power system has a wireless power transmitting device and a wireless power receiving device. During digital ping operations while the transmitting device and receiving device negotiate to establish a power level to use during normal operation, low-power wireless power signals may be transmitted to the receiving device from the wireless power transmitting device. Information gathered during the digital ping may be evaluated using a wireless-power-transmission-efficiency-to-digital-ping-rectifier-output-voltage relationship and using a normal-operation-wireless-power-transmission-efficiency-to-digital-ping-wireless-power-transmission-efficiency relationship to predict a wireless power transmission efficiency that would be experienced if the system were to enter normal operation. Based on this efficiency prediction, the system can issue alerts and can decide whether or not to enter normal operation.

22 Claims, 5 Drawing Sheets

WIRELESS POWER SYSTEM WITH EFFICIENCY PREDICTION

This application claims the benefit of provisional patent application No. 62/994,444, filed Mar. 25, 2020, which is hereby incorporated by reference herein in its entirety.

FIELD

This relates generally to power systems, and, more particularly, to wireless power systems for charging electronic devices.

BACKGROUND

In a wireless charging system, a wireless power transmitting device such as a charging mat or charging puck wirelessly transmits power to a wireless power receiving device such as battery-powered or other portable electronic device. The portable electronic device has a coil and rectifier circuitry. The coil of the portable electronic device receives alternating-current wireless power signals from the wireless charging mat. The rectifier circuitry converts the received signals into direct-current power.

SUMMARY

A wireless power system has a wireless power transmitting device and a wireless power receiving device. The wireless power transmitting device may be a wireless charging mat, charging puck, or other device that transmits wireless power signals. The wireless power receiving device may be a portable electronic device that receives the transmitted wireless power signals from the wireless power transmitting device.

Before commencing normal wireless power transmission operations, the transmitting and receiving devices may perform set-up operations (sometimes referred to as handshake operations or digital ping operations). During these set-up operations, low-power wireless power signals may be transmitted from the wireless power transmitting device. Information on the operating state of the system such as rectifier output voltage, inverter input voltage, wireless power transfer efficiency, etc. may be gathered during the digital ping. This digital ping information may be processed using a wireless-power-transmission-efficiency-to-digital-ping-rectifier-output-voltage relationship and using a normal-operation-wireless-power-transmission-efficiency-to-digital-ping-wireless-power-transmission-efficiency relationship to predict a wireless power transmission efficiency that would be experienced if the system were to enter normal operation.

Based on the predicted normal operating efficiency value, the system can issue alerts and can decide whether or not to enter normal operation.

DETAILED DESCRIPTION

A wireless power system includes a wireless power transmitting device such as a wireless charging mat. The wireless power transmitting device wirelessly transmits power to one or more wireless power receiving devices. The wireless power receiving devices may include devices such as a wrist watches, cellular telephones, tablet computers, laptop computers, or other electronic equipment. Each wireless power receiving device uses power from the wireless power transmitting device for powering the device and for charging an internal battery.

Wireless power is transmitted from the wireless power transmitting device to a wireless power receiving device using one or more wireless power transmitting coils. The wireless power receiving device has one or more wireless power receiving coils coupled to rectifier circuitry. The rectifier circuitry converts received wireless power signals from the wireless power receiving coils into direct-current power.

Figure 1:
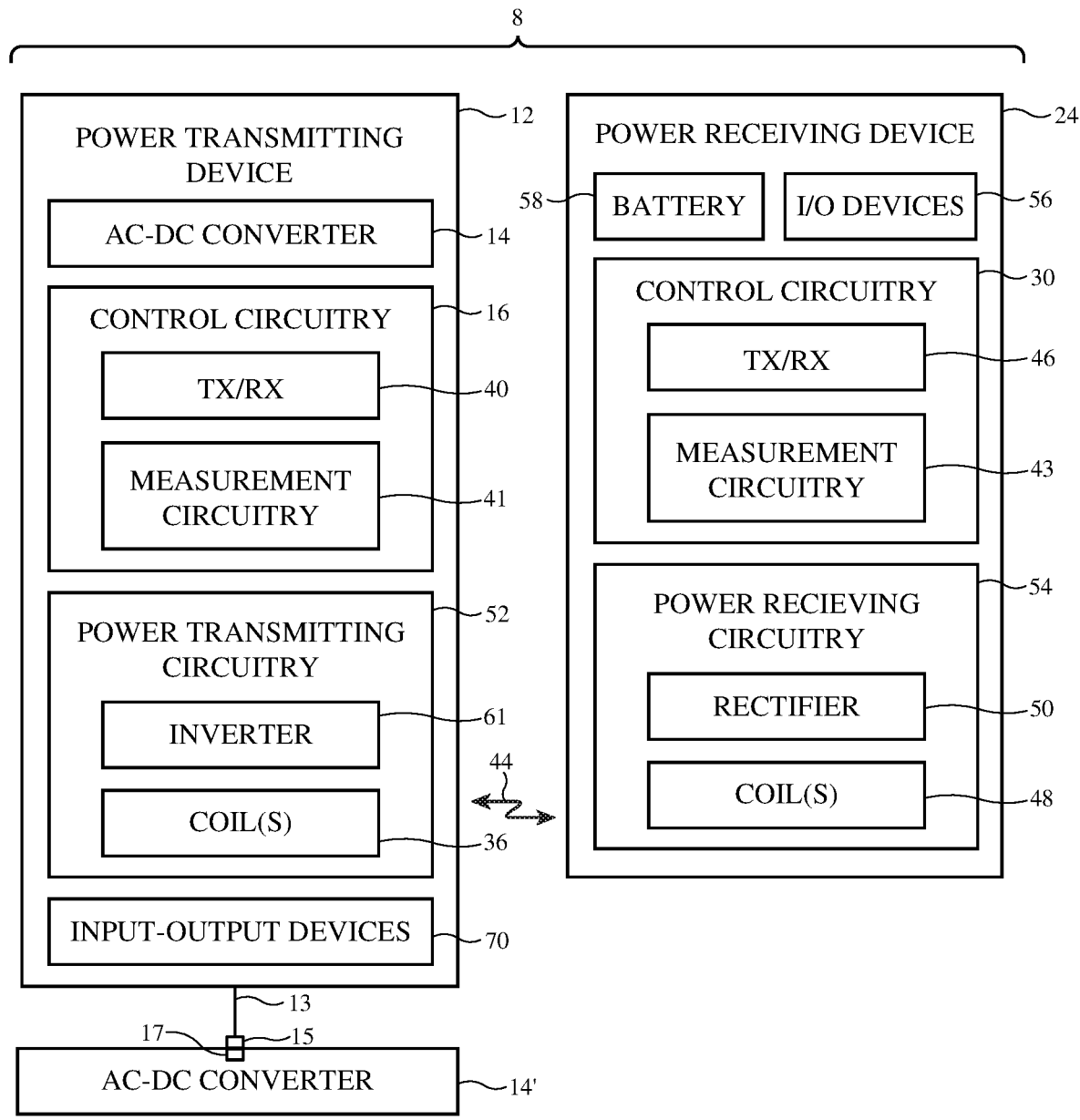
FIG. 1 is a schematic diagram of an illustrative wireless power system in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data to detect foreign objects and perform other tasks, processing user input, handling negotiations between devices 12 and 24, sending and receiving in-band and out-of-band data, making measurements, using in-band and/or out-of-band communications circuitry to transfer measurements, commands, alerts, and/or other information between devices 12 and 24, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging mat are sometimes described herein as an example.

Power receiving device 24 may be a portable electronic device such as a wrist watch, a cellular telephone, a laptop computer, a tablet computer, an accessory such as an earbud, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power.

In some embodiments, device 12 may obtain power from a stand-alone AC-DC power adapter such as AC-DC power converter 14. Stand-alone power converter 14' may have an AC plug that is plugged into a wall outlet. Converter 14' may also have a connector such as connector 17. Connector 17 may be a Universal Serial Bus (USB) connector or other connector configured to supply DC power. Device 12 may have an associated cable such as cable 13. Cable 13 may have a connector that plugs into a corresponding connector in the body of device 12 or may be pigtailed to device 12. During operation, cable 13 conveys DC power from converter 14' to device 12. Cable 13 may be a USB cable with a plug such as plug 15 (e.g., a USB plug) that is removably plugged into connector 17. In arrangements such as these in which converter 14' is a stand-alone AC-DC power adapter, device 12 may have a puck-shaped housing and may sometimes be referred to as forming a puck. Other housing shapes may be used for device 12, if desired.

DC power from an internal power adapter or from a stand-alone power adapter such as converter 14' that is conveyed to device 12 via a DC cable may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coils 36. These coil drive signals cause coil(s) 36 to transmit wireless power. Coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 (e.g., a charging mat, puck, portable device, etc.) may have only a single coil. In other arrangements, a wireless charging device may have multiple coils (e.g., two or more coils, 5-10 coils, at least 10 coils, 10-30 coils, fewer than 35 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24 such as input-output devices 56. Input-output devices 56 may include input devices for gathering user input and/or making environmental measurements and may include output devices for providing a user with output. As an example, input-output devices 56 may include a display for creating visual output, a speaker for presenting output as audio signals, light-emitting diode status indicator lights and other light-emitting components for emitting light that provides a user with status information and/or other information, haptic devices for generating vibrations and other haptic output, and/or other output devices. Input-output devices 56 may also include sensors for gathering input from a user and/or for making measurements of the surroundings of system 8. Illustrative sensors that may be included in input-output devices 56 include three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible cameras with respective infrared and/or visible digital image sensors and/or ultraviolet light cameras), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, optical sensors for making spectral measurements and other measurements on target objects (e.g., by emitting light and measuring reflected light), microphones for gathering voice commands and other audio input, distance sensors, sensors that are configured to gather information on motion, position, and/or orientation (e.g., accelerometers, gyroscopes, compasses, and/or inertial measurement units that include all of these sensors or a subset of one or two of these sensors), sensors such as buttons that detect button press input, joysticks with sensors that detect joystick movement, keyboards, and/or other sensors. Device 12 may have one or more input-output devices 70 (e.g., input devices and/or output devices of the type described in connection with input-output devices 56) or input-output devices 70 may be omitted (e.g., to reduce device complexity).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions.

It is desirable for power transmitting device 12 and power receiving device 24 to be able to communicate information such as received power, states of charge, and so forth, to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 has measurement circuitry 41. Measurement circuitry 41 may be used to detect external objects on the charging surface of the housing of device 12 (e.g., on the top of a charging mat or, if desired, to detect objects adjacent to the coupling surface of a charging puck). The housing of device 12 may have polymer walls, walls of other dielectric, metal structures, fabric, and/or other housing wall structures that enclose coils 36 and other circuitry of device 10. The charging surface may be a planer outer surface of the upper housing wall of device 12. Circuitry 41 can detect foreign objects such as coils, paper clips, and other metallic objects and can detect the presence of wireless power receiving devices 24 (e.g., circuitry 41 can detect the presence of one or more coils 48). During object detection and characterization operations, external object measurement circuitry 41 can be used to make measurements on coils 36 to determine whether any devices 24 are present on device 12.

In an illustrative arrangement, measurement circuitry 41 of control circuitry 16 contains signal generator circuitry (e.g., oscillator circuitry for generating AC probe signals at one or more probe frequencies and/or a pulse generator that can create impulses so that impulse responses can be measured to gather inductance information from the frequency of ringing signals created in response to the impulses and to gather Q-factor information from the decay envelope of the ringing signals, etc.) and signal detection circuitry (e.g., filters, analog-to-digital converters, impulse response measurement circuits, etc.). In some configurations, Q-factor measurements, inductance measurement, and other measurements may be made (e.g., before wireless power transmission operations have commenced, during wireless power transmission, during pauses between power transmission periods, and/or at other suitable times). Switching circuitry in device 12 may be used to switch desired coils into use during measurements on coils 36, during wireless power transmission, etc.

Measurement circuitry 43 in control circuitry 30 may include signal generator circuitry, pulse generator circuitry, signal detection circuitry, and other and/or measurement circuitry (e.g., circuitry of the type described in connection with circuitry 41 in control circuitry 16). Circuitry 41 and/or circuitry 43 may be used in making current and voltage measurements (e.g., inverter input current and input voltage, rectifier output current and output voltage, etc.), measurements of transmitted and received power for power transmission efficiency estimates, coil Q-factor measurements, coil inductance measurements, coupling coefficient measurements, and/or other measurements. Based on this information or other information, control circuitry 30 can characterize the operation of devices 12 and 24. For example, measurement circuitry 41 can measure coil(s) 36 to determine the inductance(s) and Q-factor value(s) for coil(s) 36, can measure transmitted power in device 12 (e.g., by measuring the direct-current voltage powering inverter 61 and direct-current current of inverter 61 and/or by otherwise measuring voltages and currents in the wireless power transmitting circuitry of device 12), and can make other measurements on operating parameters associated with wireless power circuitry and other components in device 12. In device 24, measurement circuitry 43 can measure coil(s) 48 to determine the inductance(s) and Q-factor value(s) for those coil(s), can measure received power in device 24 (e.g., by measuring the output current and output voltage Vrect of rectifier 50 and/or by otherwise measuring voltages and currents in the wireless power receiving circuitry of device 24), and can make other measurements on the operating parameters associated with wireless power circuitry and other components in device 24.

During negotiations between device 24 and 12 to set up normal power transmission (e.g., during initial wireless power transfer set-up operations before wireless power is ramped up to a level useful for battery charging) and/or later during wireless power transmission operations, measurements such as these may be used to configure system 8 (e.g., wireless power transmitting and receiving circuitry) to enhance wireless power transfer settings. Measurements such as these may also be used to help determine whether power is being lost due to the presence of a foreign object (e.g., a paper clip, coin, or other metallic object between or near devices 12 and 24) or whether devices 12 and 24 are otherwise not optimally aligned and ready for wireless power transfer. For example, the amount of power being received can be compared to the amount of power being transmitted to determine if losses are present that are associated with induced eddy currents in a foreign object.

This approach of comparing transmitted power and received power levels, which may sometimes be referred to as foreign object detection by power counting or power counting foreign object detection, can be used during normal wireless power transmission. In the event that a foreign object is detected during normal wireless power transmission operations, suitable action can be taken. For example, the amount of wireless power that is being transmitted can be lowered, wireless power transmission can be halted, an alert can be issued for a user, and/or other action may be taken.

Foreign object detection operations and operations determining whether the coils of devices 12 and 24 are misaligned can also be performed before normal wireless power transmission operations have commenced. For example, measurements with circuitry 41 and/or 43 (e.g., measurements of currents, voltages, inductances, Q-factors, wireless power transfer efficiencies, and other operating parameters) may be made during preliminary interactions between devices 12 and 24 (e.g., when a user initially places device 24 in proximity of device 12 for charging such as when a user initially places device 24 on a charging surface of device 12).

During these preliminary interactions, which may sometimes be referred to as digital ping operations, set-up operations, or transmitter-receiver preliminary negotiations, device 12 provides a relatively small amount of power (e.g., 200 mW or other small amount) to device 24 to awaken control circuitry in device 24 (e.g., without powering other load circuitry in device 24 such as display circuitry, battery charging circuitry, etc.). By powering the control circuitry and its associated communications circuitry in device 24, devices 12 and 24 can negotiate over a wireless link (e.g., an in-band link) to determine whether to proceed with normal wireless power transfer operations and to determine an appropriate wireless power transfer level for system 8 to use during normal wireless power transfer operations (e.g., a significantly larger power such as 5 W, 10 W, or other relatively large value associated with normal wireless power transmission operations, which is generally at least 5 times, at least 10 times, or at least 25 times greater than the digital ping power transmission power).

To inform a user that wireless power transmission operations (e.g., operations associated with charging battery 58) are proceeding properly (e.g., to inform the user that this process has not been terminated due to presence of a foreign object), the user may be provided with an alert. The alert, which may sometimes be referred to as a chime, may include audio and/or visual output presented on device 24 (as an example). For example, a chime may involve presentation of an audible chime tone and a visual user interface affordance (e.g., a battery charging icon or other visual alert displayed on a display in device 24 or other display). By providing the chime, the user is reassured that charging operations are proceeding normally (e.g., so that the user is comfortable walking away from system 8 and leaving devices 12 and 24 unattended until charging is complete).

Digital ping operations are typically performed relatively quickly (e.g., over a time period of 200 ms or less, less than 50 ms, less than 1 s, or other relatively short time period). Subsequent negotiations between device 12 and device 24 leading to commencement of normal (high power) power transmission operations can take significantly longer (e.g., several seconds or more). If the presentation of the chime is delayed significantly (e.g., for more than a second or so), the user may become concerned that wireless power transfer operations are not proceeding normally. If, on the other hand, the chime is presented before system 8 has determined that no foreign objects are present, there is a risk that a foreign object that is present will only be detected later (e.g., during normal operation using a power counting foreign object detection technique, at which point the user may have departed and not be present to observe that charging operations have failed).

To ensure that the chime is provided sufficiently early, the chime may, if desired, be presented during digital ping operations. This provides the user with prompt assurance (e.g., within a second or less) that wireless power will be transmitted normally and that the battery device 24 will be satisfactorily charged (e.g., after many minutes or hours). To prevent undesired false chimes (which are later invalid because a foreign object is detected only during power counting operations during normal wireless power transmission), foreign object detection operations (and operations detecting coil misalignment) are performed early as well. In particular, foreign object detection operations and/or wireless transmission efficiency evaluations for detecting misalignment may be performed during digital ping operations. In response to determining that devices 12 and 24 are satisfactorily aligned and that no foreign object is present during these digital ping foreign object detection operations, the chime may be presented to the user (e.g., with a speaker, display, and/or other output devices in device 24).

With an illustrative embodiment, foreign objects or other conditions that make it unsuitable to begin normal wireless power transmission operations (e.g., coil misalignment conditions) can be detected during digital ping operations by using information gathered during the digital ping to predict the wireless power transfer efficiency that will be achieved during subsequent normal operation. The predicted efficiency value may, as an example, be compared to a predetermined threshold amount. If the predicted efficiency is sufficiently high, system 8 can conclude that the coils of system 8 are aligned satisfactorily and that no foreign objects are present. System 8 may therefore enter normal operation, the chime may be presented to the user (e.g., device 12 may direct device 24 to issue an alert indicating that a battery of device 24 is charging), and wireless power may be transmitted at normal operation power levels from device 12 to device 24. If, however, the predicted efficiently is low, system 8 may forgo transmitting wireless power at elevated levels. System 8 may, if desired, alert the user that efficiency is low (e.g., because devices 12 and 24 may not be aligned properly) and/or may return to performing efficiency monitoring operations and other digital ping operations (e.g., device 12 may direct device 24 to issue an alert indicating that wireless power transmission is not in progress).

Figure 2:
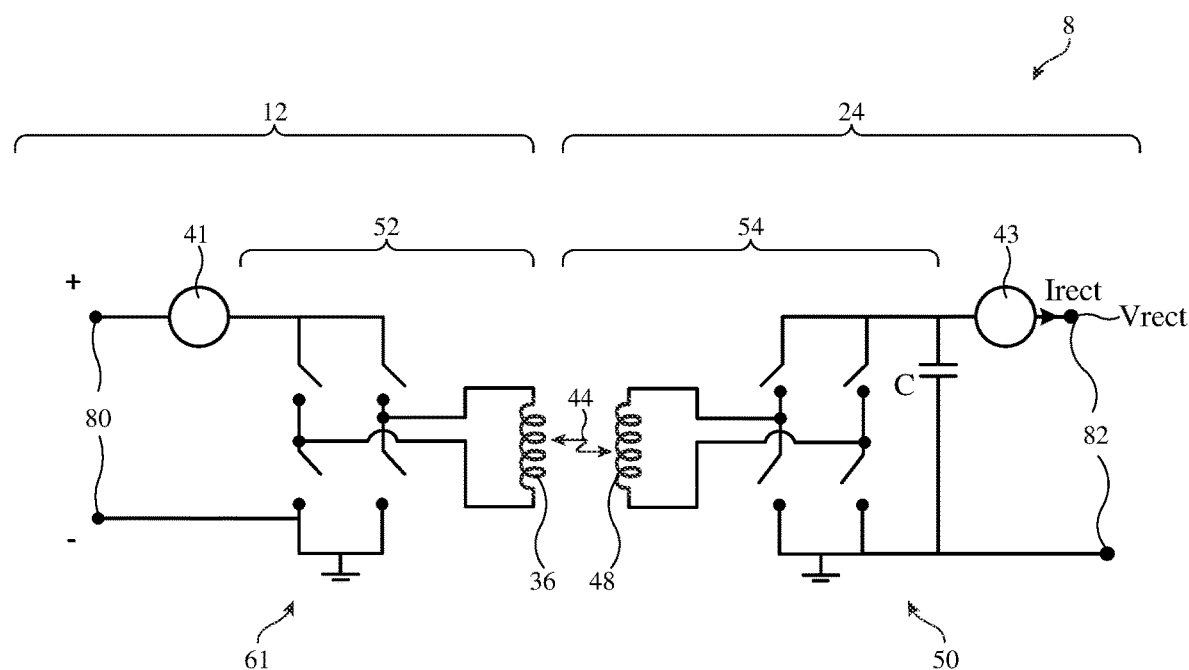
FIG. 2 is a circuit diagram of an illustrative wireless power system in accordance with an embodiment.

FIG. 2 is a circuit diagram of illustrative circuitry that may be used in system 8. As shown in FIG. 2, wireless power transmitting circuitry 52 may receive direct current power at wireless power transmitting circuitry input terminals 80 and may use inverter circuitry 61 (e.g., transistor-based switches) to produce and drive AC currents through coil 36 to transmit wireless power signals 44 (e.g., magnetic flux) from coil 36. Wireless power receiving circuitry 54 uses coil 48 to receive the wirelessly transmitted signals 44 and uses rectifier circuitry 50 (e.g., transistor-based switches and capacitor C) to convert the received signals to DC power (output voltage Vrect) at output terminals 82 or rectifier 50 (which are the output terminals of wireless power receiving circuitry 54). In the example of FIG. 2, the switches of circuitry 54 have a full-bridge configuration, which allows circuitry 54 to operate also as an inverter in wireless power transmitting circuitry (e.g., in a mode in which device 24 is transmitting power to an external device such as device 12). The switches of circuitry 52 of FIG. 2 also have a full-bridge configuration, which allows circuitry 52 to be operated as a rectifier in wireless power receiving circuitry to receive wireless power transmitted by device 24 to device 12. If desired, circuitry 52 may be configured to only operate as a wireless power transmitter and circuitry 54 may be configured to only operate as a wireless power receiver.

In the circuit of FIG. 2, measurement circuitry 41 may be used to monitor the operation of circuitry 52. For example, measurement circuitry 41 may be used to monitor the DC current flowing to circuitry 52 from the power supply of device 12 (e.g., the input current to inverter 61 and circuitry 52) and may be used to monitor the input voltage to inverter 61 and circuitry 52. In this way, the power supplied to circuitry 52 may be measured. Measurement circuitry 43 may be used to monitor the output voltage Vrect of rectifier 50 in circuitry 54 and may be used to measure the corresponding output current of rectifier 50 and circuitry 54. The measured values of rectifier output voltage and rectifier output current may be used to determine the output power of receiving circuitry 54. The measurements of circuitry 43 can be conveyed to device 12 during digital ping operations and/or at other times (e.g., using in-band communications) and/or the measurements of circuitry 41 can be conveyed to device 24 during digital ping operations and/or at other times (e.g., using in-band communications). By sharing these measurements, control circuitry in system 8 (e.g., device 12 and/or device 24) can measure wireless power transfer efficiency levels and can share this information. In some examples, the efficiency of device 12 in transferring wireless power to device 24 can be measured by control circuitry 16 (FIG. 1) by dividing the received power (power supplied at the output of circuitry 54) by the transmitted power (power supplied at the input of circuitry 52). In some examples, the efficiency of device 12 in transferring wireless power to device 24 can be measured by control circuitry 30 (FIG. 1) by dividing the received power (power supplied at the output of circuitry 54) by the transmitted power (power supplied at the input of circuitry 52).

The operation of system 8 tends to be non-linear, which can present challenges in trying to predict the wireless power transfer efficiency that will be achieved during normal operation (sometimes referred to herein as ηno) from measurements made when not operating at normal power levels. For example, it can be challenging to use measurements from circuits 41 and 43 that are obtained during digital ping operations (where power levels may be, for example, about 200 mW) to predict ηno. This can make it challenging to use digital ping measurements to determine whether or not to proceed to normal operation. User experience may be impacted if digital ping measurements lead to wireless power transfer operations that charge a battery too slowly.

In accordance with an embodiment, the operation of system 8 may be characterized in advance to determine relationships between digital ping measurements and subsequent operation at normal power levels. Using these relationships, digital ping measurements can be used to accurately predict the efficiency levels that will likely be achieved during subsequent wireless power transfer operations at higher power. If the predicted efficiency during normal operation is insufficient, system 8 can conclude that a foreign object is present between devices 12 and 24 that is preventing satisfactorily wireless power transfer and/or can conclude that devices 12 and 24 (e.g., coils 36 and 48) are misaligned or that other non-optimal conditions are present. System 8 (e.g., device 12) can then forgo wireless power transfer operations at the elevated powers associated with normal operation, and can optionally alert the user of system 8 and/or take other suitable action. If predicted normal operation efficiency is sufficiently high, system 8 may increase the amount of wireless power that is being transmitted and can proceed with normal operation, and can optionally alert the user that normal operation is commencing.

The operation of system 8 can be characterized using mathematical models and/or using empirical techniques. Factors that influence wireless power transmission efficiency include power transmission levels, rectifier output voltage Vrect, rectifier output current Irect, magnetic coupling between devices 12 and 24, etc. To characterize system 8 under a variety of potential operating conditions, robotic measurement equipment and/or other equipment for monitoring the performance of system 8 may make system measurements while varying the relative position of coils 36 and 48 (e.g., by moving device 24 to a variety of different positions relative to device 12 such as different vertical separations Z and different lateral positions X and Y). These measurements may include measurements made at different operating currents Irect. For example, a series of measurements may be made at a first rectifier output current (e.g., a first current level such as a current of 25 mA or other relatively low current that is associated with digital ping operations) and a series of measurements may be made at a second rectifier output current (e.g. a second current level such as a current of 75 mA or other relatively high current that is associated with higher power operations such as normal wireless power transfer operations during the normal powering of device 24 to perform tasks such as charging battery 58, operating input-output devices 56 such as a display, etc.). At each of the different relative coil positions and at each of the operating currents, measurements may be made over a range of output voltages Vrect. Efficiency measurements may also be made at different power levels during these measurements.

Figure 3:
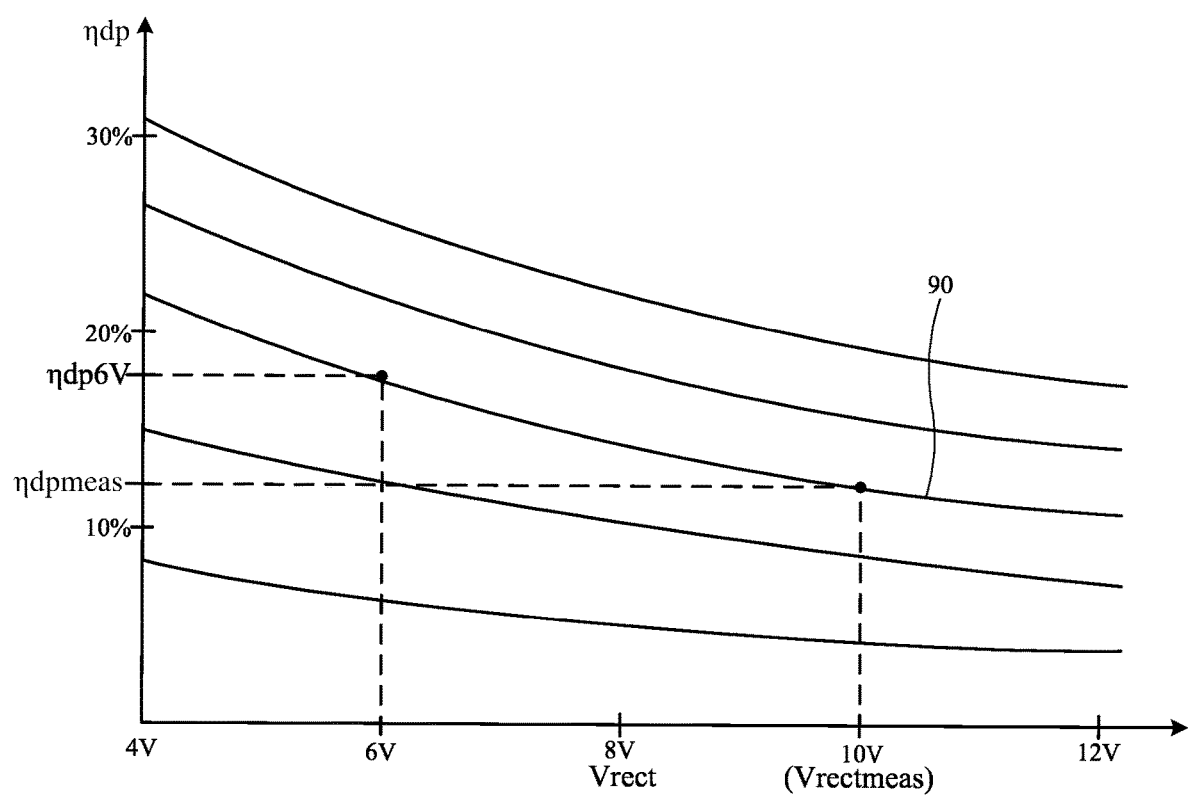
FIG. 3 is a graph of an illustrative efficiency-voltage relationship between rectifier output voltage and wireless power transfer efficiency during digital ping operations at a digital ping rectifier current in accordance with an embodiment.
Figure 4:
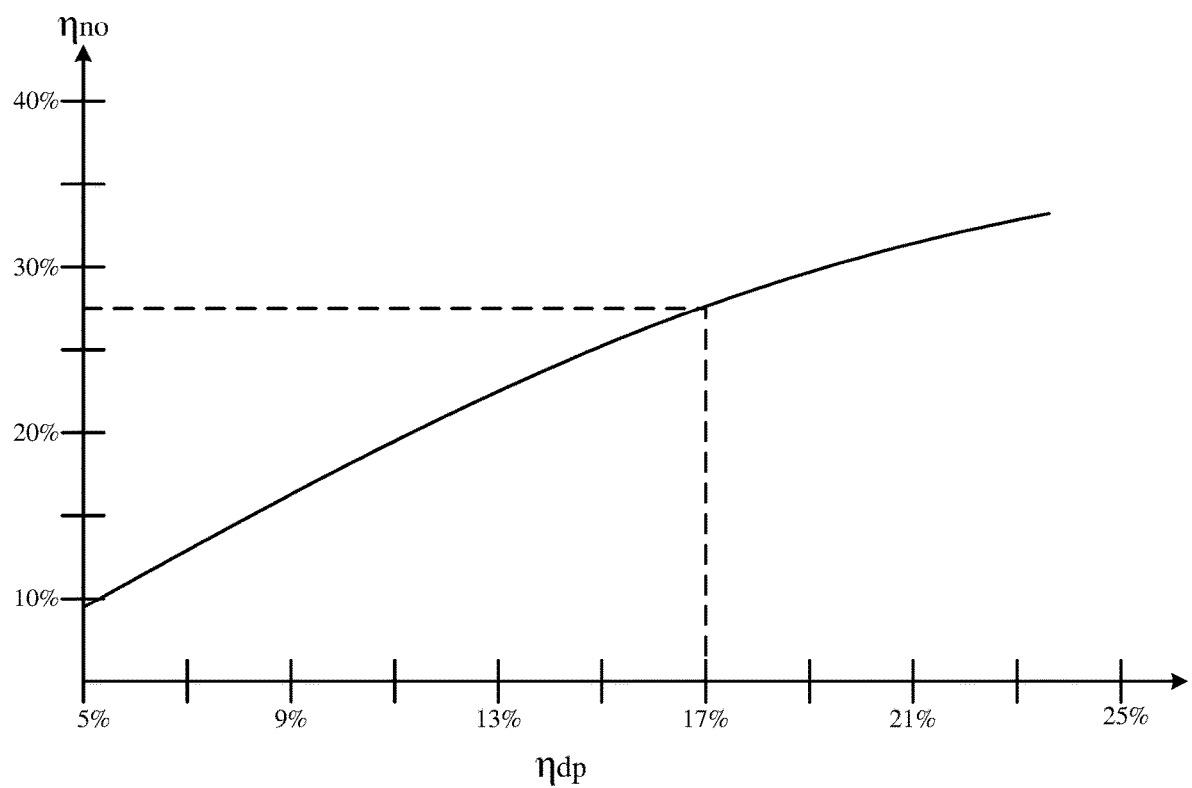
FIG. 4 is a graph of an illustrative efficiency-efficiency relationship between wireless power transfer efficiency during digital ping operations and wireless power transfer efficiency during normal operation in accordance with an embodiment.

The characterizing measurements, which may be made, for example, during manufacturing, may be used to produce a family of curves such as the family of curves of FIG. 3 and may be used to produce a curve such as the curve of FIG. 4. The curves of FIG. 3 represent a wireless-power-transmission-efficiency-to-digital-ping-rectifier-voltage relationship. The curve of FIG. 4 represents a normal-operation-wireless-power-transmission-efficiency-to-digital-ping-wireless-power-transmission-efficiency relationship. These relationships may be used to help accurately predict the efficiency that system 8 will exhibit during wireless power transmission at normal power conditions from digital ping measurements involving wireless power transmission at reduced power conditions.

During digital ping operations, the output current from circuitry 54 may be maintained at the first current level (e.g., 25 mA). For example, measurement circuitry 43 may measure the output current from circuitry 54 and can inform device 12 whenever the output current starts to rise above 25 mA (e.g., to direct device 12 to decrease the amount of wireless power being transmitted) and whenever the output current starts to fall below 25 mA (e.g., to direct device 12 to increase the amount of wireless power being transmitted). Using this type of feedback arrangement or other closed-loop control scheme, the amount of wireless power being transmitted from device 12 to device 24 can be regulated to ensure that Irect stays constant at the 25 mA (or other suitable first current value).

While maintaining Irect at 25 mA, the value of Vrect across terminals 82 is allowed to fluctuate. In a typical scenario, the value of Vrect might rise above the normal operating voltage output level from circuitry 54. During normal operation, for example. Vrect may be 6 V (as an example), whereas during digital ping operations in which Irect is held at 25 mA, Vrect may be larger than 6 V. As an example, Vrect may be 10 V during digital ping operations at a 25 mA rectifier output current. The value of voltage Vrect during digital ping operations (e.g., 10 V in this example) may sometime be referred to as the digital ping rectifier output voltage.

The power transfer efficiency of system 8 varies as a function of Irect and Vrect. During digital ping operations, Irect is maintained at the first current level (e.g., 25 mA), while the value of Vrect floats and is measured by measurement circuitry 43. A relatively small amount of power (e.g., 250 mW) is drawn by the circuitry of device 24 during digital ping. The measured value of the output of circuitry 54 during digital ping is Vrectmeas. In an illustrative scenario, when Irect is maintained at 25 mA during digital ping operations, Vrect can become 10 V (Vrectmeas=10 V). A digital ping efficiency ηdpmeas is associated with operation of device 24 at Irect=25 mA and Vrect=Vrectmeas (e.g., 10 V). The value of ηdpmeas is equal to the output power Pout from circuitry 54 divided by input power Pin to circuitry 52 while Irect is at the digital ping current level of 25 mA and Vrect=Vrectmeas. In the illustrative scenario of FIG. 3, when Irect=25 mA and Vrectmeas is 10V, the value of ηdpmeas is 12%.

The family of curves of FIG. 3 represents a relationship between digital ping wireless power transfer efficiency ηdp (output power Pout from circuitry 54 divided by input power Pin into circuitry 52 while Irect is at the digital ping current level of 25 mA) and voltage Vrect. Five representative curves in this family of curves are shown in FIG. 3. By making multiple measurements over a variety of relative positions between devices 12 and 24, numerous curves (e.g., tens, hundreds, or thousands of curves for this family) can be measured.

Using the relationship of FIG. 3, the value of wireless power transfer efficiency that would be obtained during digital ping if Vrect were at its normal operating value can be obtained from the measured value Vrectmeas and the measured value of digital ping efficiency ηdpmeas at Vrectmeas. Consider, as an example, a scenario in which the normal operating voltage at the output of circuitry 54 is 6V (e.g., Vrect=6 V during normal operation). During these normal operations, while wireless power is being transmitted from device 12 to device 24, the output power and output current of circuitry 54 are at normal levels (e.g., the output power is above the digital ping power level and the Irect value is above the digital ping value). To determine the digital ping efficiency of system 8 at the normal operating voltage of 6V, the value of Vrectmeas and the measured digital ping wireless power transfer efficiency ηdpmeas=12% may be used to select a matching curve from the family of curves of FIG. 3. The identified curve (curve 90 in this example) can then be used to determine what the value of ηdp would be at a normal Vrect operating voltage of 6V. This predicted ηdp value, which is labeled as ηdp6V in FIG. 3, may be 17% (as an example).

To compactly represent the overall relationship embodied by the family of curves of FIG. 3, so that this information can be stored efficiently in system 8 (e.g., in control circuitry 16 of device 12 and/or other storage in device 12 and/or device 24), a curve-fitting process may be performed. In an illustrative embodiment, polynomial curve fitting may be used. For example, all of the curves in the family of curves can be averaged to produce an average curve. Using quadratic curve fitting, the values of A and B may then be obtained for equation 1.

$$\eta dp = A[(Vrect)^2 - (Vrectmeas)^2] + B[Vrect - Vrectmeas] + \eta meas \quad (1)$$

In equation 1, ηdp is digital ping wireless power transfer efficiency, Vrect is the output voltage of rectifier 50. Vrectmeas is the value of Vrect when Irect is maintained at the digital ping current (e.g., at 25 mA), and ηmeas is the measured efficiency offset at Vrect=Vrectmeas. From the quadratic curve fitting, values for A and B may be obtained such as A=0.001 and B=−0.0027 (as an example).

After determining the value of ηdp6V from the digital ping efficiency versus rectifier output voltage relationship of equation 1 using the measured digital ping efficiency ηmeas and the measured digital ping rectifier output voltage Vrectmeas as inputs, the efficiency at normal operating voltage Vrect=6 V and a targeted Irect value (e.g., a predetermined Irect value or an Irect value obtained from device 24 during digital ping such as an Irect value of 75 mA or other value that may be associated with normal operation) may be obtained using the relationship of FIG. 4. The curve of FIG. 4 represents a normal-operation-wireless-power-transmission-efficiency-to-digital-ping-wireless-power-transmission-efficiency relationship and can be used to predict normal operation efficiency ηno at 6 V from the digital ping efficiency at 6 V (ηdp6V) that is produced using the relationship of FIG. 3. The efficiency-efficiency relationship of FIG. 4 may be obtained empirically (e.g., from efficiency measurements made while varying the relative positions between devices 24 and 12 as described in connection with the empirical measurements of FIG. 3). As with the relationship of equation 1, any suitable storage techniques may be used to store this information in system 8 (e.g., look-up tables, equations, etc.) If desired, curve fitting (e.g., polynomial curve fitting such as quadratic curve fitting) may be used to produce the values of C, D, and ηos in equation 2 and this equation may be stored in system 8.

$$\eta no = C\eta dp^2 + D\eta dp + \eta os \quad (2)$$

In the illustrative embodiment. C is −1.7112. D is 1.8348, and offset value ηos is 0.0053.

In the present example, ηdp6V is 17%, so the value of ηno from the relationship of FIG. 4 is 27%. The relationship of FIG. 4 therefore produces a desired final result—the predicted efficiency ηno that is expected to be obtained during normal operation at the normal Vrect operation voltage (6 V in this example). The value of ηno corresponds to operation at a different rectifier current than used during digital ping (e.g., 75 mA or other value that is higher than the 25 mA level of digital ping operations). The predicted normal operation efficiency value ηno can be compared to a predetermined threshold value and suitable action taken in response to the outcome of this comparison.

Figure 5:
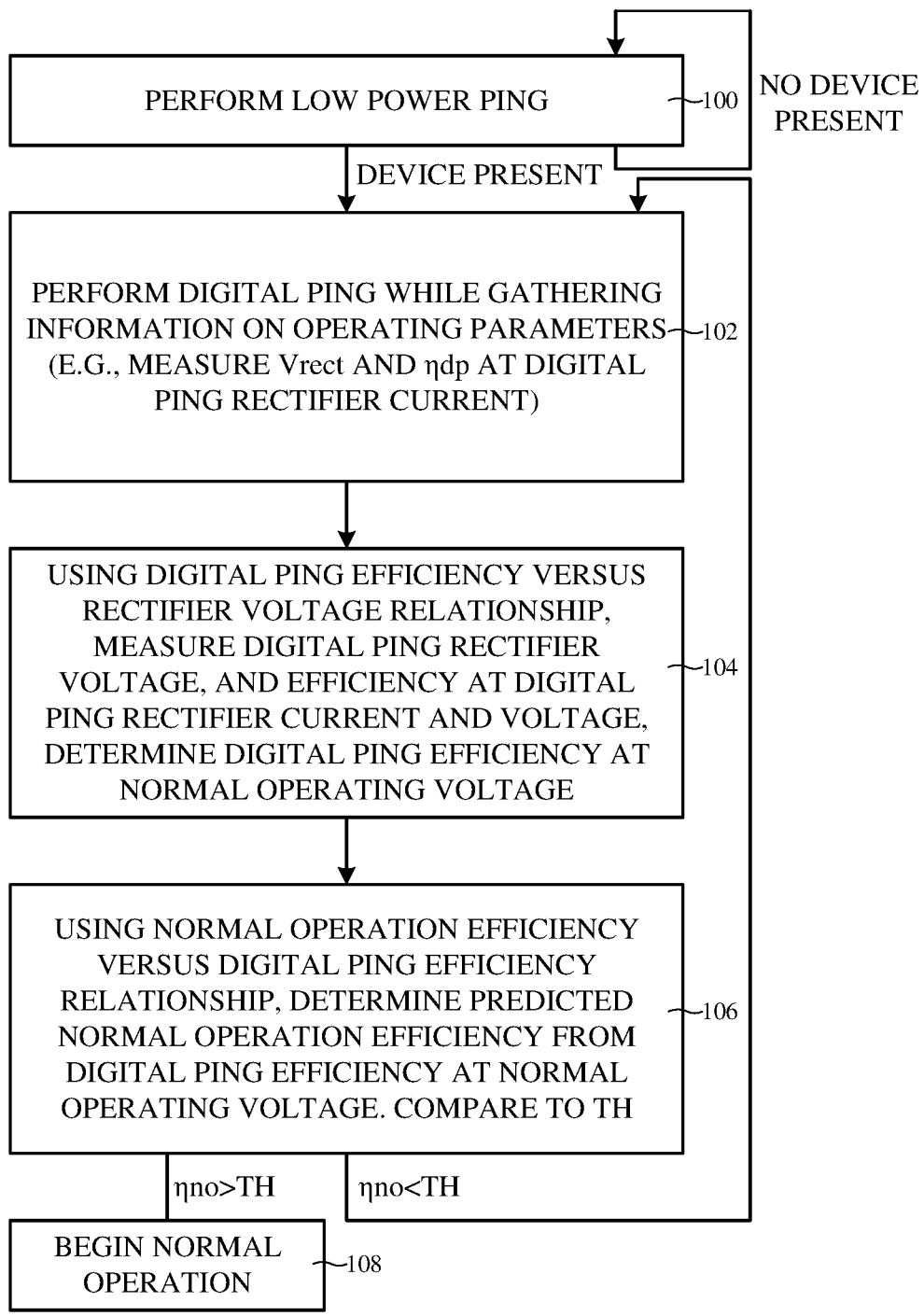
FIG. 5 is a flow chart of illustrative operations involved in operating a wireless power system in accordance with an embodiment.

Illustrative operations involved in transferring wireless power in system 8 are shown in FIG. 5.

During the operations of block 100, measurement circuitry 41 may perform measurements to determine whether device 24 is present on device 12 (e.g., to determine whether coil 48 is present on coil 36). These measurements may include, for example, measuring the impedance of coil 36, measuring the Q factor of coil 36, and/or performing other measurements that indicate when wireless power receiving device 24 has been brought into proximity of wireless power transmitting device 12. These operations may be performed periodically until the presence of device 24 is detected.

In response to determining that device 24 is present, operations may proceed to block 102. During the operations of block 102, system 8 may perform set-up operations between devices 12 and 24 (sometimes referred to as a digital ping). The set-up operations involve transmitting a small amount of power wirelessly from device 12 to device 24 (e.g., 250 mW) and performing negotiations to establish normal wireless power transmission operations. During the digital ping, devices 12 and 24 may use measurement circuitry (e.g., measurement circuitry 41 in device 12 and measurement circuitry 43 in device 24) to measure operating voltages and currents. In-band communications or other wireless communications may be used to allow device 24 to transmit measurements and/or commands to device 12 so that device 12 can increase and decrease the amount of wireless power being transmitted in system 8, thereby maintain the output current of circuitry 54 at a desired value (e.g., Irect=25 mA in the present example). Device 12 may use information on the input current and voltage of circuitry 52 and the output current and voltage of circuitry 54 to determine Vrectmeas and ηdpmeas.

After obtaining Vrectmeas and ηdpmeas, these values can be used as inputs to the relationship of FIG. 3 (e.g., the relationship of equation 1). This allows system 8 (e.g., device 12) to determine the value of ηdp at a normal operating voltage associated with normal wireless power transmission (e.g., a Vrect voltage associated with normal operation of system 8 such as the Vrect value associated with normal operation of system 8 at a rectifier output power above the digital ping output power). In the present example, this Vrect value is 6 V, so ηdp is evaluated at 6 V, thereby producing ηdp6V. The Vrect value of 6 V during normal operation serves as an additional input to the relationship of FIG. 3.

During the operation of block 106, the value of ηdp6V that was obtained from the output of the efficiency-voltage relationship of FIG. 3 is used as an input to the efficiency-efficiency relationship of FIG. 4 (e.g., the relationship of equation 2). This allows system 8 (e.g., device 12) to predict the operating efficiency ηno of system 8 during normal operation at the normal Vrect value (Vrect=6 V) and an Irect value of 75 mA or other suitable normal operating current that is larger than the digital ping rectifier current (25 mA in this example).

During the operations of block 106, the value of ηno may be compared to a predetermined threshold efficiency value. The threshold TH may have a value of 20% or other suitable threshold value.

If the predicted normal operating efficiency for system 8 is less than TH, operations may continue during block 102 (e.g., additional digital ping operations may be performed). If desired, a warning message such as a visual and/or an audible warning (alert) may be presented to a user (e.g., using a display in device 24, etc.). Device 12 may send a command to device 24 that directs device 24 to present the warning and/or device 12 may present a warning.

In response to determining that ηno is greater than TH, appropriate action may be taken during the operations of block 108. As an example, wireless power transmission may commence so that wireless power signals 44 may be transmitted from device 12 to device 24 at normal operating powers (e.g., a power level greater than the digital ping power level). During normal operation, system 8 may continuously adjust the amount of wireless power being transmitted (e.g., device 12 may transmit more or less power based on commands from device 24, and/or other control schemes may be used to adjust the amount of transferred wireless power). If desired, system 8 (e.g., device 24) may be used to present visual and/or audible messages to a user to indicate that normal wireless power transmission operations will commence or have commenced (e.g., an audible chime tone and a visual user interface affordance such as a battery charging icon or other visual alert may be presented by system 8). For example, in response to determining that ηno is greater than TH, a visible battery charging icon may be presented on the display of device 24 (e.g., in response to a command sent wirelessly from device 12 to device 24), an audible tone indicating that charging has been successfully started may be issued, and/or other alert information may be presented to a user.

Different power transmitting devices 12 may have different power transmission capabilities. For example, the power rating of a first power transmitting device may be 5 W, whereas the power rating of a second power transmitting device may be 10 W. In configurations in which device 12 is receiving DC power from a stand-alone power adapter, the power rating of the combined system (device 12 and the stand-alone power adapter) may be determined by the power rating of the power adapter. For example, device 12 may be a wireless charging puck that can be plugged into various different USB power adapters (see, e.g., AC-DC converter 14' of FIG. 1, which may be housed within a stand-alone housing that is separate from the housing of device 12). When plugged into a USB power adapter with a first power rating, device 12 will at most be able to use a first amount of DC input power to transmit wireless power signals, whereas when plugged into a USB power adapter with a second power rating that is larger than the first power rating, device 12 will be able to use the larger second amount of DC input power in transmitting wireless power.

For a given wireless power transmission efficiency level, a self-contained power transmitting device with a higher power rating or a power transmitting device that has a higher power rating by virtue of being coupled to a higher-rated stand-alone AC-DC power adapter will be able to transmit more power to power receiving device 24 than a lower-rated stand-alone power transmitting device or a power transmitting device coupled to a stand-alone AC-DC power adapter with a lower power rating.

Variations between different types of transmitting device configurations may, if desired, be taken into account when determining whether or not to begin normal operation (e.g., when analyzing the predicted normal operation efficiency to determine whether to proceed to the normal operations of block 108 or to return instead to the digital ping operations of block 102).

Consider, as an example, a scenario in which a user has two power transmitting devices (e.g., one located at home and the other at work). The first of the devices may be powered by a stand-alone USB power adapter with a power rating of 10 W and the second of the devices may be powered by a stand-alone USB power adapter with a power rating of 5 W. It may be desirable to ensure that the user is provide with a relatively uniform user experience despite switching back and forth between these two different charging configurations from time to time.

To help ensure that the user's experience is satisfactorily uniform, in both situations chime should occur only if a minimum charging experience can be achieved. If use of the first and second power transmitting devices to charge power receiving device 24 results in the issuance of identical chimes but widely different charging times, the user may be unnecessarily confused.

User confusion can be reduced by causing chimes to be issued based both on the predicted charging efficiency and on the power transmitting capability of the transmitting device (sometimes referred to as the power rating of the device). The power transmitting capacity of each transmitting device may, in configurations with stand-alone AC-DC power adapters, be dictated by the power rating of the stand-alone AC-DC power adapter that is connected to each device 12 rather than an inherent power transmitting limit of that device 12. As a result of issuing chimes based both on the predicted efficiency and power transmitting capability for each device 12, a device with the ability to deliver a higher power may be given some leeway with respect to the required efficiency threshold level (threshold TH) for normal operation (or, put another way, a lower power rated system may be held to a higher standard than a higher power rated system).

For example, a somewhat stringent threshold (e.g., a first threshold TH1 of 20%) may be imposed for lower power transmitting devices such as power transmitting devices 12 coupled to USB power adapters with power ratings of 5 W, whereas a more lenient threshold (e.g., a second threshold TH2 of 10%) may be imposed for higher power transmitting devices such as power transmitting devices 12 coupled to USB power adapters with power ratings of 10 W. In effect, this type of approach bases the decision on whether to issue a chime to the user and proceed to normal operation at block 108 on a prediction of the amount of power to be transmitted during charging (equal to the efficiency multiplied by the power rating) and a comparison of this predicted power transfer level to a power transfer level threshold.

Each stand-alone power transmitting device 12 may store information on its power rating (e.g., 5 W, 10 W, etc.) in storage (e.g., in control circuitry 16 in that power transmitting device). Each power transmitting device 12 that is coupled to a USB power adapter or other stand-alone AC-DC power adapter (converter 14' of FIG. 1) with a power rating may obtain the power rating of the power adapter via USB data communications (e.g., communications using the USB-PD standard) or other communications with that power adapter. The power adapters themselves may have control circuitry such as control circuitry 16 of device 12 that contains memory in which the power rating of the power adapter is stored. Power rating information for device 12 and/or adapters 14 may, as an example, be programmed into memory in during manufacturing. When used in system 8, device 12 can retrieve power rating information from an associated stand-alone power adapter (and can optionally store this information locally) by querying the power adapter over the USB cable between device 12 and the power adapter (as an example). Device 12 can the use this power rating information in assessing the power transmission capabilities of device 12 (e.g., the power rating of the adapter may effectively become the power rating of device 12) and can use the power rating information in determining when to issue chimes.

By basing the criteria used to determine whether to enter normal operation on both efficiency information and on transmitter power rating information, the user may be presented with chimes in a reasonably consistent fashion. A user would not, for example, be provided with a chime indicating that charging is proceeding properly only because the predicted normal operating efficiency exceeds a fixed threshold. Rather, the chime would only be provided if the efficiency and power rating taken together are deemed to be capable of providing a user with a reasonable charging time.

In general, any suitable technique may be used to implement a decision scheme based on both predicted normal operation wireless power transfer efficiency and power transmitting device transmitting power capacity. In one embodiment, the predicted normal operation efficiency is multiplied by the transmitting power capacity of device 12 to produce a predicted normal operation power transfer level, which may then be compared to a power level threshold that is uniform across transmitters with different power ratings. In another embodiment, the predicated normal operation efficiency is compared to an efficiency threshold that varies as a function of power transfer capacity. To ensure that lower-rated devices (e.g., devices 12 that are coupled to 5 W adapters) can charge properly, these lower-rated devices may be required to exhibit higher predicted normal operation efficiency values than higher-rated devices (e.g., devices 12 that are coupled to 10 W adapters).

The foregoing is merely illustrative and various modifications can be made to the described embodiments. The foregoing embodiments may be implemented individually or in any combination.

What is claimed is:

1. A wireless power transmitting device, comprising:
   wireless power transmitting circuitry configured to transmit wireless power signals to wireless power receiving circuitry that has a rectifier in a wireless power receiving device; and
   control circuitry coupled to the wireless power transmitting circuitry, the control circuitry configured to:
      during digital ping operations in which the wireless power signals are transmitted from the wireless power transmitting circuitry to the wireless power receiving circuitry at a first wireless power level, obtain information on operation of the wireless power transmitting circuitry and the wireless power receiving circuitry, wherein the information includes a first wireless power transfer efficiency associated with transmitting the wireless power signals from the wireless power transmitting circuitry to the wireless power receiving circuitry at the first wireless power level; and
      based on the first wireless power transfer efficiency, predict a second wireless power transfer efficiency associated with transmitting the wireless power signals at a second wireless power level after the digital ping operations have been completed.

2. The wireless power transmitting device of claim 1 wherein the information comprises a first rectifier output voltage for the rectifier of the wireless power receiving circuitry and wherein the control circuitry is configured to predict the second wireless power transfer efficiency based on the first rectifier output voltage.

3. The wireless power transmitting device of claim 2 wherein the control circuitry is configured to use a predetermined efficiency-voltage relationship between digital ping wireless power transfer efficiency and digital ping rectifier output voltage in predicting the second wireless power transfer efficiency.

4. The wireless power transmitting device of claim 3 wherein the control circuitry is configured to use the first rectifier output voltage as an input to the predetermined efficiency-voltage relationship.

5. The wireless power transmitting device of claim 4 wherein the control circuitry is configured to use the first wireless power transfer efficiency as an input to the predetermined efficiency-voltage relationship.

6. The wireless power transmitting device of claim 5 wherein the control circuitry is configured to use an efficiency-efficiency relationship to predict the second wireless power transfer efficiency.

7. The wireless power transmitting device of claim 6 wherein the control circuitry is configured to use, as an input to the efficiency-efficiency relationship, an efficiency value obtained from the efficiency-voltage relationship that corresponds to operation of the rectifier at a predetermined rectifier output voltage that is lower than the digital ping rectifier output voltage.

8. The wireless power transmitting device of claim 7 wherein the control circuitry is configured to compare the second wireless power transfer efficiency to a predetermined threshold.

9. The wireless power transmitting device of claim 8 wherein the control circuitry is configured to:
in response to determining that the second wireless power transfer efficiency is greater than the predetermined threshold, control the wireless power transmitting circuitry to transmit the wireless power signals at the second wireless power level.

10. The wireless power transmitting device of claim 8 wherein the control circuitry is configured to:
in response to determining that the second wireless power transfer efficiency is greater than the predetermined threshold, direct the wireless power receiving device to issue an alert, wherein the alert indicates that a battery of the wireless power receiving device is charging.

11. The wireless power transmitting device of claim 8 wherein the control circuitry is configured to:
in response to determining that the second wireless power transfer efficiency is lower than the predetermined threshold, forgo controlling the wireless power transmitting circuitry to transmit the wireless power signals at the second wireless power level.

12. The wireless power transmitting device of claim 8 wherein the control circuitry is configured to:
in response to determining that the second wireless power transfer efficiency is lower than the predetermined threshold, direct the wireless power receiving device to issue an alert, wherein the alert indicates that wireless power transmission is not in progress.

13. The wireless power transmitting device of claim 1 further comprising a plug configured to mate with an AC-to-DC power adapter, wherein the AC-to-DC power adapter has a power rating, wherein the control circuitry is configured to:
obtain the power rating from the AC-to-DC power adapter when the plug is connected to the AC-to-DC power adapter, and
issue an alert based on the second wireless power transfer efficiency and the power rating.

14. A non-transitory computer-readable storage medium storing one or more programs configured to be executed by one or more processors of a wireless power transmitting device that, when executed, cause a wireless power transmitting device to provide wireless power charging operations to a wireless power receiving device, the computer-executable instructions comprising instructions for:
during set-up operations, performing negotiations between the wireless power transmitting device and the wireless power receiving device to set up normal wireless power transmission operations that charge a battery in the wireless power receiving device;
during the set-up operations, determining a predicted efficiency value for wireless power transmissions from the wireless power transmitting device to the wireless power receiving device during the normal wireless power transmission operations; and
in response to determining that the predicted efficiency value is greater than a predetermined efficiency threshold, commencing the normal wireless power transmission operations.

15. The non-transitory computer-readable storage medium of claim 14, wherein the computer-executable instructions further comprise instructions for:
using an efficiency-voltage relationship and an efficiency-efficiency relationship in determining the predicted efficiency value.

16. The non-transitory computer-readable storage medium of claim 15, wherein the computer-executable instructions further comprise instructions for:
determining a first rectifier output voltage corresponding to operation of a rectifier in the wireless power receiving device during the set-up operations.

17. The non-transitory computer-readable storage medium of claim 16, wherein the computer-executable instructions further comprise instructions for:
determining a first wireless power transmission efficiency value corresponding to wireless power transmission from the wireless power transmitting device to the wireless power receiving device during the set-up operations.

18. The non-transitory computer-readable storage medium of claim 17, wherein the efficiency-voltage relationship is a relationship between output voltage of the rectifier and efficiency of the wireless power transmission during the set-up operations and wherein the computer-executable instructions further comprise instructions for:
determining an efficiency value from the efficiency-voltage relationship using as inputs: the first rectifier output voltage, the first wireless power transmission efficiency value, and a second rectifier output voltage that corresponds to operation of the rectifier during the normal wireless power transmission operations.

19. The non-transitory computer-readable storage medium of claim 18, wherein the efficiency-efficiency relationship is a relationship between set-up operation efficiency during the set-up operations and normal operation efficiency during the normal wireless power transmission operations and wherein the computer-executable instructions further comprise instructions for:
determining the predicted efficiency value using the efficiency value determined from the efficiency-voltage relationship as an input to the efficiency-efficiency relationship.

20. The non-transitory computer-readable storage medium of claim 14, wherein the computer-executable instructions further comprise instructions for:
in response to determining that the predicted efficiency value is greater than a predetermined efficiency threshold, causing the wireless power receiving device to present an alert indicating that the normal wireless power transmission operations are commencing.

21. The non-transitory computer-readable storage medium of claim 14, wherein the computer-executable instructions further comprise instructions for:
in response to determining that the predicted efficiency value is greater than a predetermined efficiency threshold and before commencing the normal wireless power transmission operations, causing the wireless power receiving device to present a visual alert on a display of the wireless power receiving device indicating that the normal wireless power transmission operations are commencing.

22. A non-transitory computer-readable storage medium storing one or more programs configured to be executed by one or more processors of a wireless power transmitting device that, when executed, cause a wireless power transmitting device to provide wireless power charging operations to a wireless power receiving device, the computer-executable instructions comprising instructions for:

during digital ping operations in which the wireless power transmitting device and the wireless power receiving device negotiate to establish a wireless power transmission level for normal wireless power transmission operations to charge a battery in the wireless power receiving device, predicting, using a wireless-power-transmission-efficiency-to-digital-ping-rectifier-output-voltage relationship and using a normal-operation-wireless-power-transmission-efficiency-to-digital-ping-wireless-power-transmission-efficiency relationship, an efficiency value for the normal wireless power transmission operations; and in response to determining that the predicted efficiency value is greater than a predetermined efficiency threshold, commencing the normal wireless power transmission operations.

* * * * *